(12) United States Patent
Sibbett et al.

(10) Patent No.: US 8,724,672 B2
(45) Date of Patent: May 13, 2014

(54) LASER

(75) Inventors: Wilson Sibbett, Fife (GB); Christian Brown, Fife (GB); Nikolaus Klaus Metzger, Fife (GB)

(73) Assignee: University Court of the University of St Andrews, St Andrews (GB)

( * ) Notice: Subject to any disclaimer, the term of this patent is extended or adjusted under 35 U.S.C. 154(b) by 0 days.

(21) Appl. No.: 12/778,859

(22) Filed: May 12, 2010

(65) Prior Publication Data

US 2011/0122900 A1   May 26, 2011

(30) Foreign Application Priority Data

Nov. 26, 2009 (GB) .................................. 0920752.3

(51) Int. Cl.
*H01S 3/08* (2006.01)

(52) U.S. Cl.
USPC .................. 372/98; 372/92; 372/99; 372/100

(58) Field of Classification Search
USPC ........................................ 372/92, 98, 99, 100
See application file for complete search history.

(56) References Cited

U.S. PATENT DOCUMENTS

| | | | | |
|---|---|---|---|---|
| 4,249,140 | A * | 2/1981 | Frieberg ..................... | 372/38.01 |
| 5,212,698 | A * | 5/1993 | Kafka et al. ..................... | 372/18 |
| 6,163,559 | A * | 12/2000 | Watson ........................ | 372/102 |
| 6,192,064 | B1 * | 2/2001 | Algots et al. .................... | 372/99 |
| 6,212,217 | B1 * | 4/2001 | Erie et al. ....................... | 372/102 |
| 6,493,374 | B1 * | 12/2002 | Fomenkov et al. ........... | 372/102 |
| 6,498,803 | B2 * | 12/2002 | Heist et al. ..................... | 372/99 |
| 2001/0009560 | A1 | 7/2001 | Heist et al. | |
| 2002/0136245 | A1 * | 9/2002 | Pang ............................... | 372/20 |
| 2002/0141471 | A1 | 10/2002 | Aab et al. | |
| 2004/0233944 | A1 * | 11/2004 | Dantus et al. ................... | 372/25 |
| 2006/0056468 | A1 * | 3/2006 | Dantus et al. ................... | 372/28 |
| 2007/0014317 | A1 * | 1/2007 | Liu et al. ............................ | 372/6 |
| 2007/0291812 | A1 * | 12/2007 | Petersen et al. ............... | 372/103 |

OTHER PUBLICATIONS

N. K. Metzger et al, "Ultrashort-pulse laser with designer optical phase"; Lasers and Electro-optics 2009, European Quantum Electronics Conference, Jun. 14-19, 2009; p. 1; Current version published Jun. 6, 2009.

Kraig E. Sheetz et al, "Ultrafst optics: imaging and manipulating biological systems"; Journal of Applied Physics, 105, 051101-1-17, (2009); See p. 051101-6 and the section on pulse shaping.

Jeffrey J. Field et al, "Quartic-phase limited grism-based ultrashort pulse shaper"; Lasers and Electro-Optics, 2008 and 2008 Conference on Quantum Electronics and Laser Science. pp. 1-2.

International Search Report for GB Application No. 0920752.3 dated Feb. 24, 2010.

* cited by examiner

*Primary Examiner* — Yuanda Zhang
(74) *Attorney, Agent, or Firm* — W. Kevin Ransom; Nicholas C. Russell; Moore & Van Allen PLLC

(57) ABSTRACT

An ultrashort-pulse laser that has a resonator that includes a laser gain medium, dispersion compensation optics, and a deformable optical element adapted to change its shape and consequently one or more characteristics of pulses output from the cavity.

13 Claims, 7 Drawing Sheets

LASER

FIELD OF THE INVENTION

The present invention relates to a laser. In particular, the invention relates to a laser that has a variable output.

BACKGROUND

Femtosecond lasers are well known and used for many different applications. For example, femtosecond lasers are frequently used for bio-medical applications such as confocal microscopy, flow cytometry, multiphoton, excitation microscopy; laser machining, such as engraving, marking, drilling, rapid prototyping; and general scientific applications such as fluorescence spectroscopy, LIDAR, molecular spectroscopy, and ultrafast spectroscopy.

Commercial ultrashort-pulse lasers are engineered towards an optimum in pulse spectral width, short pulse duration and power. However, typically the beam output from the laser has to pass through several external optical components before reaching a desired location at which an experiment is to be performed. This causes dispersion, resulting in spreading of the pulses in time. This dispersion causes the pulse to attain a phase shift of its frequency components, which is called a 'frequency chirp'.

To overcome the problem of dispersion, a pulse compressor or an adaptive optics pulse shaper may be placed in the beam path from the laser. These apply the inverse of the phase shift or chirp to the pulse phase profile. This inversely chirped or 'pre-chirped' pulse is compressed when propagating through the relay optics and a dispersion-free pulse can thus be delivered to the experiment. Examples of suitable compressors include a prism pulse compressor, a grating pulse compressor and a dispersion-shifted optical fiber. Examples of pulse shapers that exploit adaptive optics include a liquid crystal-based spatial light modulator (SLM), pulse shaper and a deformable mirror pulse shaper.

Although the use of compressors and/or adaptive optics externally to the laser overcomes some of the problems of dispersion, doing so generally introduces a loss of power and adds complexity to the setup.

SUMMARY OF THE INVENTION

According to one aspect of the present invention, there is provided a laser that has a laser cavity that includes a laser gain medium adapted to emit a spectrum of light and a deformable mirror located in a Fourier plane or focus of the cavity at a position where the spectrum is spatially resolved.

Dispersion compensation element/s (such as, for example, prism/s or Gires-Tournois interferometer (GTI) mirrors) may be provided within the cavity to compensate for estimated or expected dispersion caused by elements internal and/or external to the laser.

By providing a deformable mirror within the optical cavity of the laser itself, one or more characteristics of the output pulses can be varied internally to the laser without requiring complex external optics. For example, pulse shaping and pulse pre-chirping can be readily implemented by phase control. Additionally, this configuration can be used for optimization of the laser cavity to emit pulses with shorter duration, by minimizing the intracavity losses.

One or more optical elements adapted to resolve spatially the spectrum at the deformable optical element may be provided.

The deformable optical element may be positioned at a Fourier plane of the cavity.

The deformable optical element may comprise a deformable mirror. The deformable optical element may comprise a device based on liquid crystal technology.

Means may be provided within the laser cavity for controlling intracavity group velocity dispersion.

The means for controlling group velocity dispersion can comprise an intracavity prism or prism pair. Additionally or alternatively, beam expansion optics may be included in the laser cavity.

Control means may be provided for varying the shape of the deformable mirror. The control means may be operable to optimize one or more of the pulse characteristics. The control means may comprise one or more algorithms and these may be genetic optimization algorithms.

The one or more pulse characteristics may include one or more of pulse duration; pulse temporal phase; pulse spectrum; pulse spectral phase; pulse shape and pulse phase shape.

Means may be provided for the passive generation of ultrashort pulses. The passive generation means may be based on one or more optical components and/or rely on optical properties of materials used to form the laser cavity.

BRIEF DESCRIPTION OF THE DRAWINGS

Various aspects of the invention will now be described by way of example only and with reference to the accompanying drawings, of which.

DETAILED DESCRIPTION OF THE DRAWINGS

Figure 1:
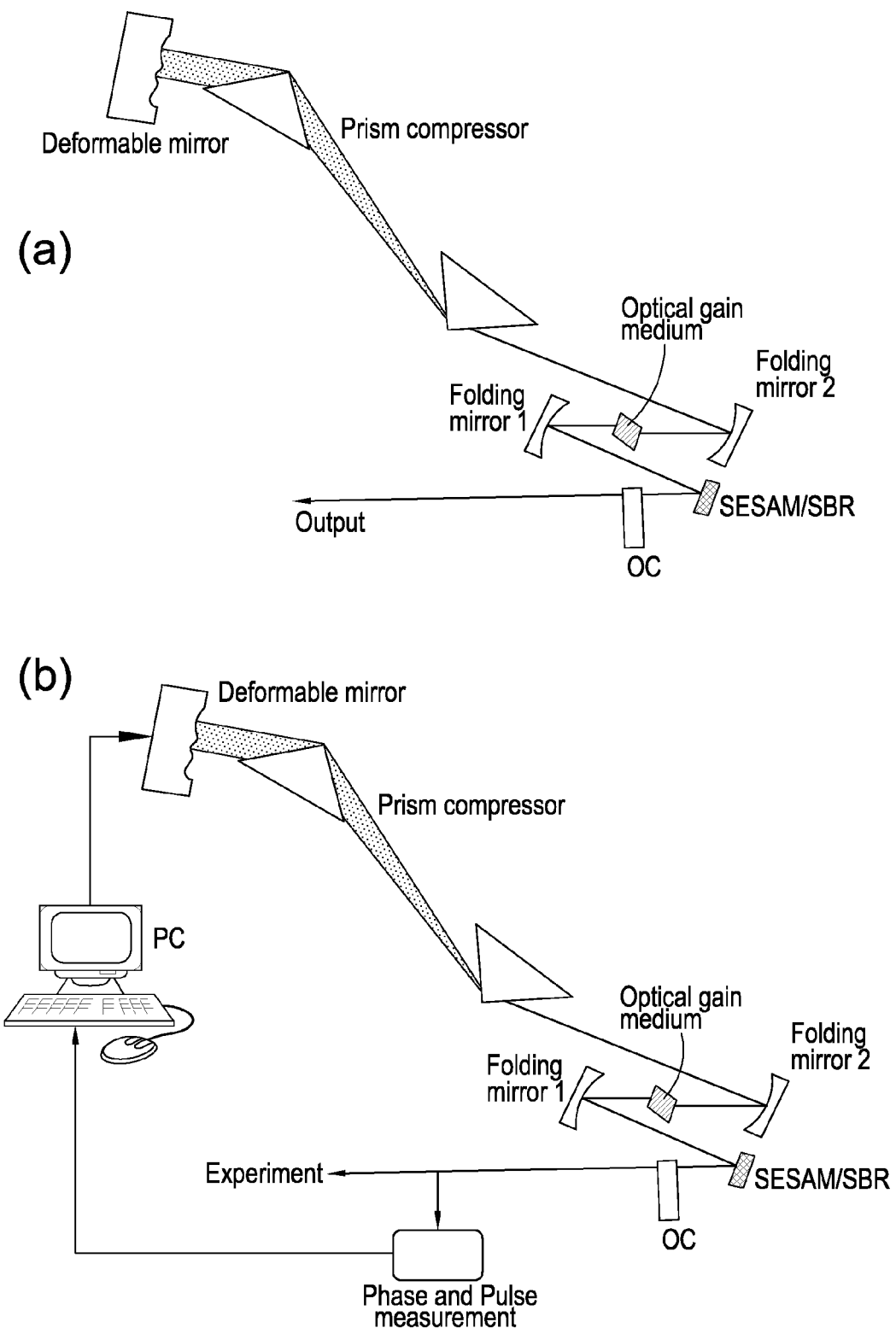
FIG. 1 (*a*) is a schematic diagram of a laser that has a deformable mirror to facilitate pulse shaping internal to the laser; (*b*) is a schematic diagram of modified version of the laser of FIG. 1 (*a*); incorporating an feedback loop for adaptive phase shaping and optimization.

FIG. 1(*a*) shows an ultrashort-pulse laser, for example, a femtosecond laser oscillator, that has a resonant laser cavity in which an optical gain material, typically a crystal, is positioned between two focusing, folding mirrors (labeled 1 and 2). Light circulating in the cavity has a spectral range defined by the optical gain medium. Means may be provided for the passive generation of ultrashort pulses. The passive generation means may be based on one or more optical components and/or rely on optical properties of materials used to form the laser cavity. Techniques for generating such pulses are known in the art.

Positioned at one of the Fourier planes of the cavity and where the spectrum is spatially resolved is a highly reflecting deformable mirror. The laser can be mode-locked using an intracavity mode-locking element, for example, using a semiconductor saturable absorber mirror (SESAM) also called a saturable Bragg reflector (SBR). Alternatively, Kerr-lens mode locking could be used. Optical radiation exits the cavity through a semitransparent output coupling mirror (OC) or its equivalent. In the example shown in FIG. 1, the cavity has an asymmetric design, i.e. the distances between the crystal and the output mirror and the crystal and the other end of the cavity, where the deformable mirror is positioned, are different.

To compensate for positive group velocity dispersion, a pair of prisms is located in one arm of the cavity between the deformable mirror and the second of the folding mirrors. Optical radiation incident on the first prism is spectrally dispersed and collimated by the second prism. This provides an initial temporal compression of the pulse. Due to the asymmetric layout of the cavity, the spatially dispersed spectrum is focused onto the deformable mirror. The spectrum is retro-reflected by the deformable mirror.

By inducing changes in the deformable mirror surface profile, it is possible to individually alter the optical path lengths travelled by the spectral components of the pulse, resulting in the imposition of different relative phases of its spectral components. By varying the surface of the mirror the intracavity losses can be minimized and the efficiency of the laser thus improved. The deformation of the mirror can also be used to further shorten the pulses, as different orders of frequency chirp can be compensated and these are inaccessible to intracavity prism/s, grating/s or GTI mirror/s alone.

FIG. 1(b) shows a laser that has a similar optical arrangement to that of FIG. 1(a). In this case, the laser includes a computer for controlling the deformable mirror and a frequency resolved optical gating (FROG) system for pulse characterization (pulse and pulse phase characterization can be realized in numerous other ways). FROG systems/algorithms are well known in the art and so will not be described in detail. A feedback loop is provided between the laser output, the FROG system and the computer.

In use, optical radiation coupled out of the laser resonator is analyzed using the FROG system to provide a measure of one or more pulse characteristics, for example, the pulse spectrum, the pulse phase and the pulse duration. This information is provided to the computer, which uses a genetic optimization algorithm (GOA) to optimize the pulse, and sends commands to manipulate the deformable mirror, to cause the mirror surface to change so that the one or more pulse characteristics converge towards one or more targets.

Figure 2:
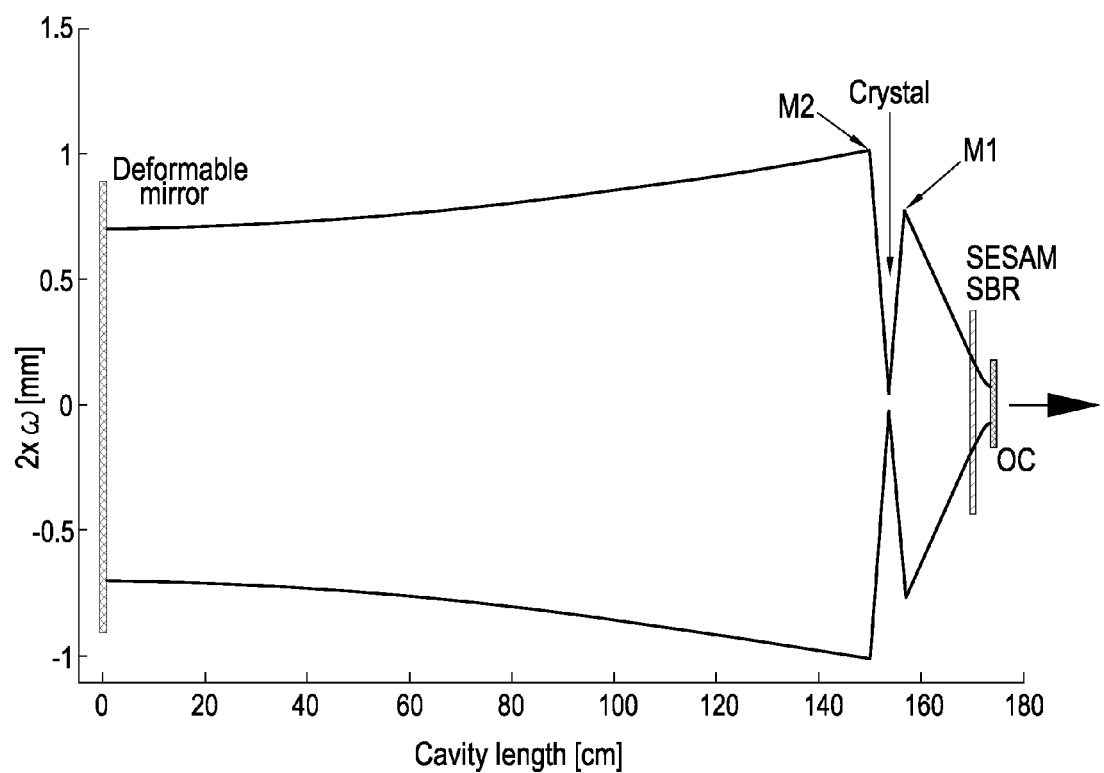
FIG. 2 shows the calculated mode profile of the laser cavity.

FIG. 2 shows a simulated mode of the laser cavity of FIG. 1, with the position of the individual components marked. This shows that the deformable mirror is placed at one of the Fourier planes of the cavity. It also shows that the SESAM is placed ahead of the output coupler, but not at a focal point of the cavity to allow the pulses to be coupled out of the cavity.

Figure 3:
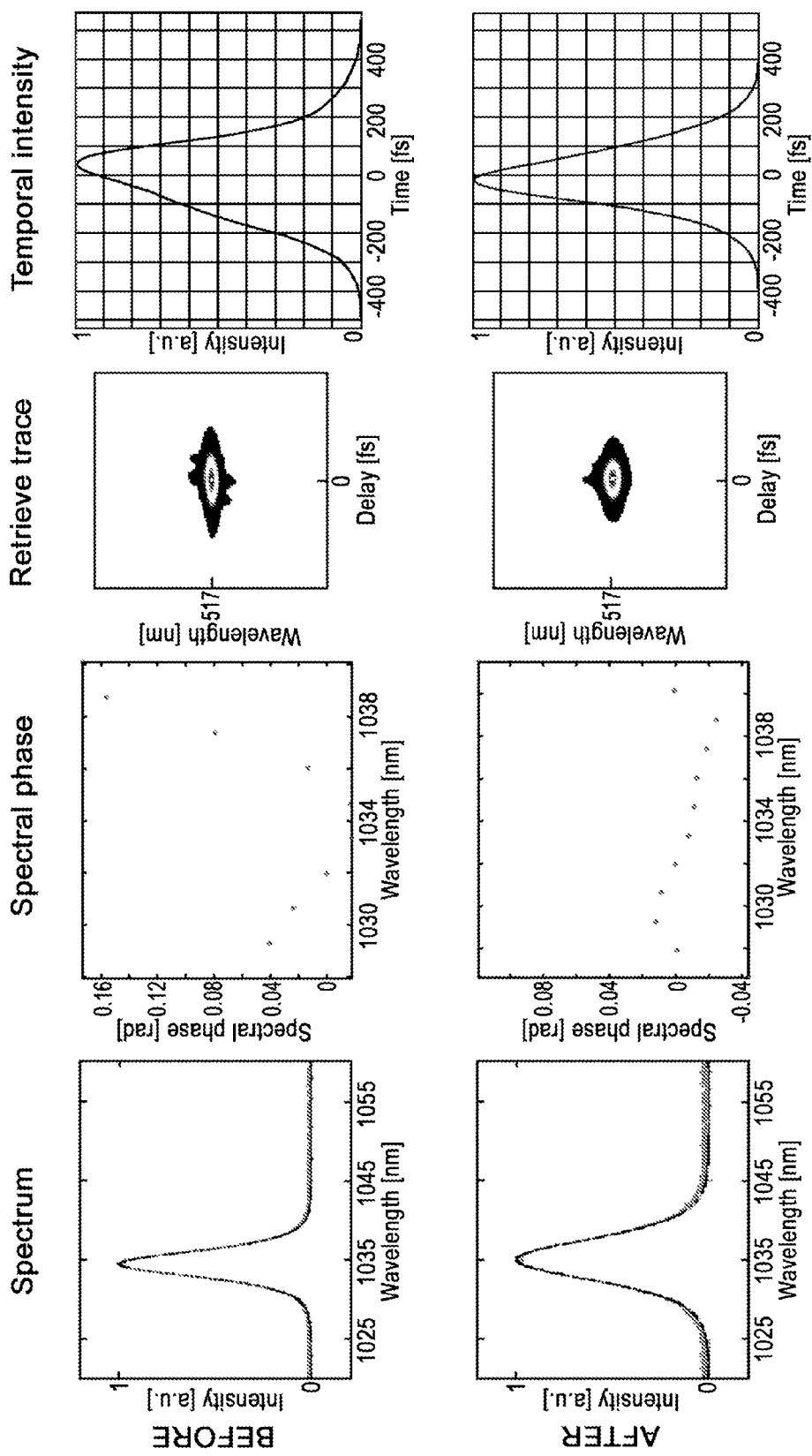
FIG. 3 shows plots of intensity vs. wavelength; spectral phase vs. wavelength; wavelength vs. delay and time vs. intensity both before and after pulse duration shortening by minimizing the intracavity losses.

FIG. 3 shows various outputs from the system before and after pulse duration optimization. The top row (from left to right) shows the pulse parameters before optimization: initial spectrum, spectral phase, retrieved FROG trace and initial temporal intensity. At the beginning of the optimization procedure the spectral width is 3.9 nm and the spectral phase fluctuates by >0.16 radian, the pulse at this initial stage has a 278 fs duration. The bottom row shows the pulse parameters after optimization by the GOA (left to right) where the spectral width has increased to 6.2 nm indicating a minimization of intracavity losses and the spectral phase variation has decreased to <0.04 radian indicating a compensation of higher-order frequency chirps. The retrieved FROG and temporal intensity traces indicate that the pulse duration has shortened to 204 fs.

The pulse duration optimization illustrated in FIG. 3 can be used for self-optimization of the laser without the need for the intervention of a skilled engineer. This is needed, for example, to compensate for misalignment or as part of an initial setup of the laser to get shortest pulse durations possible. To achieve this, the GOA optimizes towards a target pulse duration that is shorter than the current one emitted by the laser. The shape of the mirror is altered until the target specification is reached or the output is as close as possible to this target specification.

Optimizing the pulse duration has an effect on the phase, which is typically flattened. This gives the prospect of making 'super short pulses' from a femtosecond laser because different (higher) orders of chirp can be compensated, which are inaccessible to intracavity prisms alone. This is important for femtosecond lasers emitting pulses with durations below 50 fs and this is a novel example of self-optimization of a laser, by pulse duration shortening via loss minimization and higher-order chirp compensation.

Figure 4:
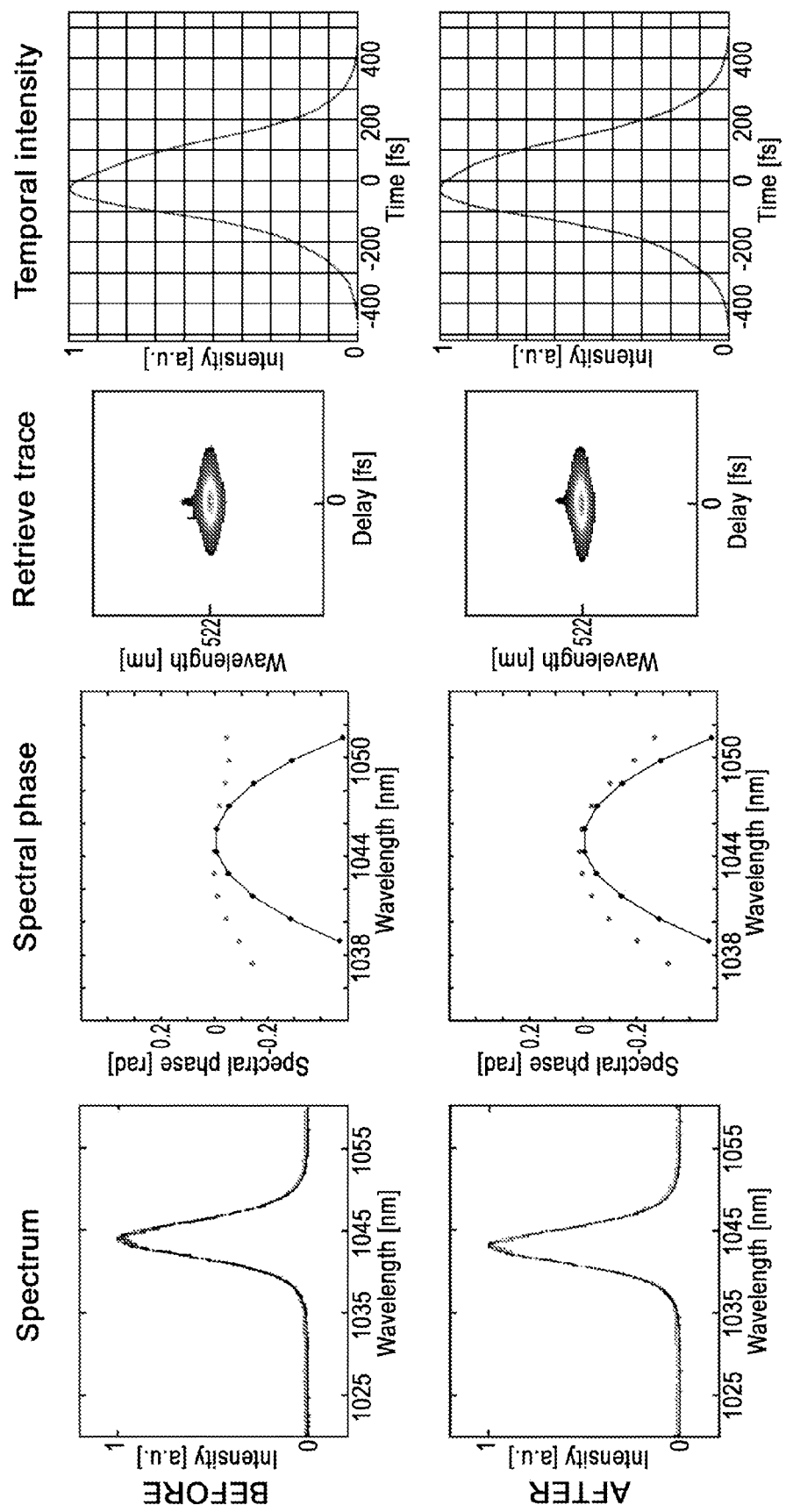
FIG. 4 shows plot of intensity vs. wavelength, spectral phase, delay vs. wavelength and time vs. intensity both before and after pulse pre-chirping.

FIG. 4 shows various outputs from the system before and after pulse pre-chirping. In this case, the genetic optimization algorithm (GOA) has been set up to cause the mirror to change, such that the spectral phase of the output pulses converges towards a quadratic profile. The top row of FIG. 4 shows the initial spectrum, initial spectral phase (dots) which is nearly flat and the target quadratic phase (black dots with line), as well as the retrieved trace and the temporal intensity indicating pulses with duration of 266 fs. Following the initiation of the genetic optimization algorithm (GOA) (bottom row) the spectral phase has changed from its initially flat outline and converged towards a quadratic profile. This retrieved trace indicates a spread of the pulse in time to 297 fs. The quadratic phase shape of the pre-chirped pulse should thus allow for compensation for pulse propagation in 70 cm of optical glass.

Figure 5:
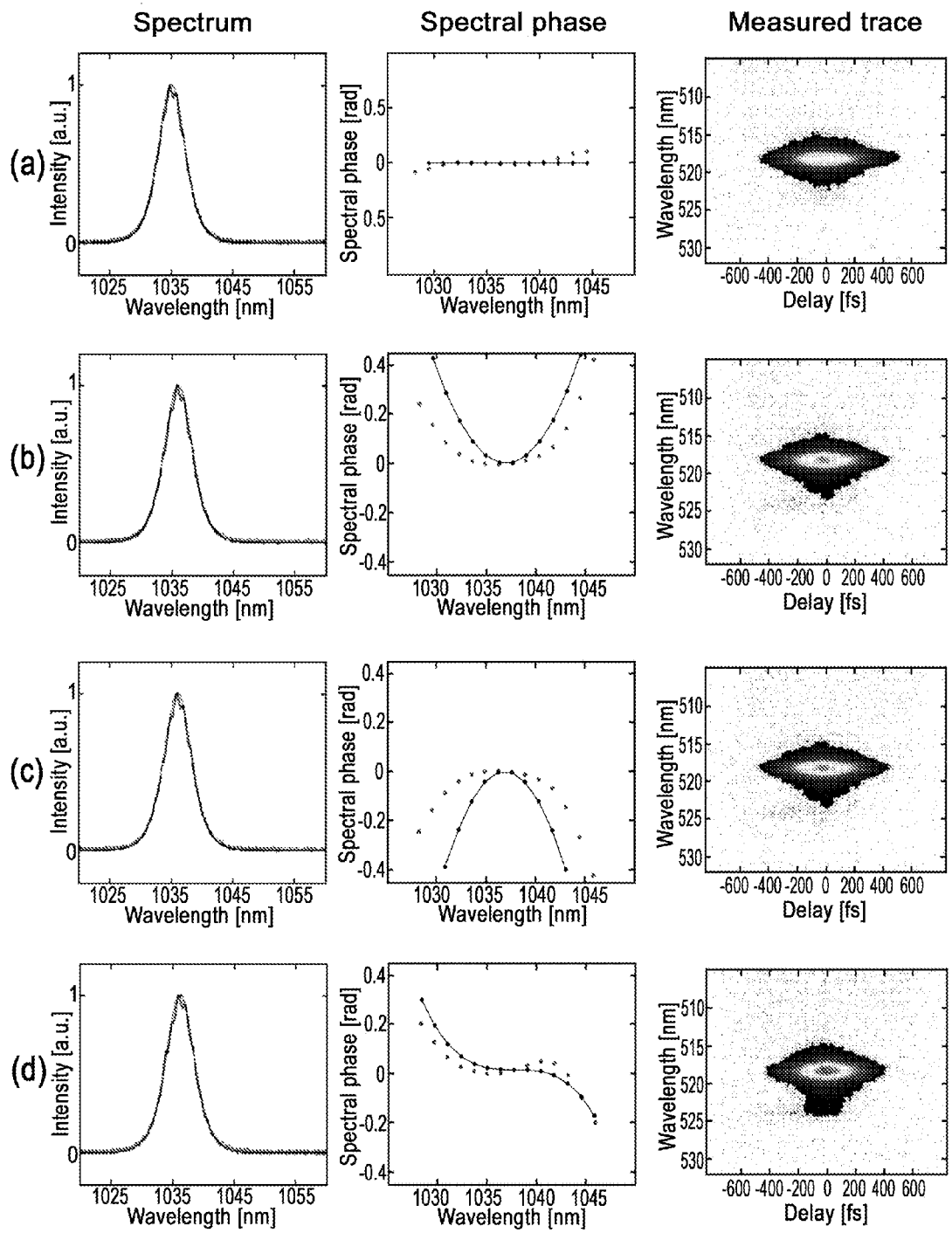
FIG. 5 shows plots of intensity vs. wavelength; spectral phase vs. wavelength, and wavelength vs. delay for different phase shapes (a) to (d)

FIG. 5 shows various other examples of phase shapes that can be realized by changing the shape of the deformable mirror. This includes: (a) flat phase; (b) positive quadratic phase; (c) negative quadratic phase and (d) cubic phase. The laser maintains its operating wavelength and spectral bandwidth during all of these shaping examples, as well as a constant output power.

Figure 6:
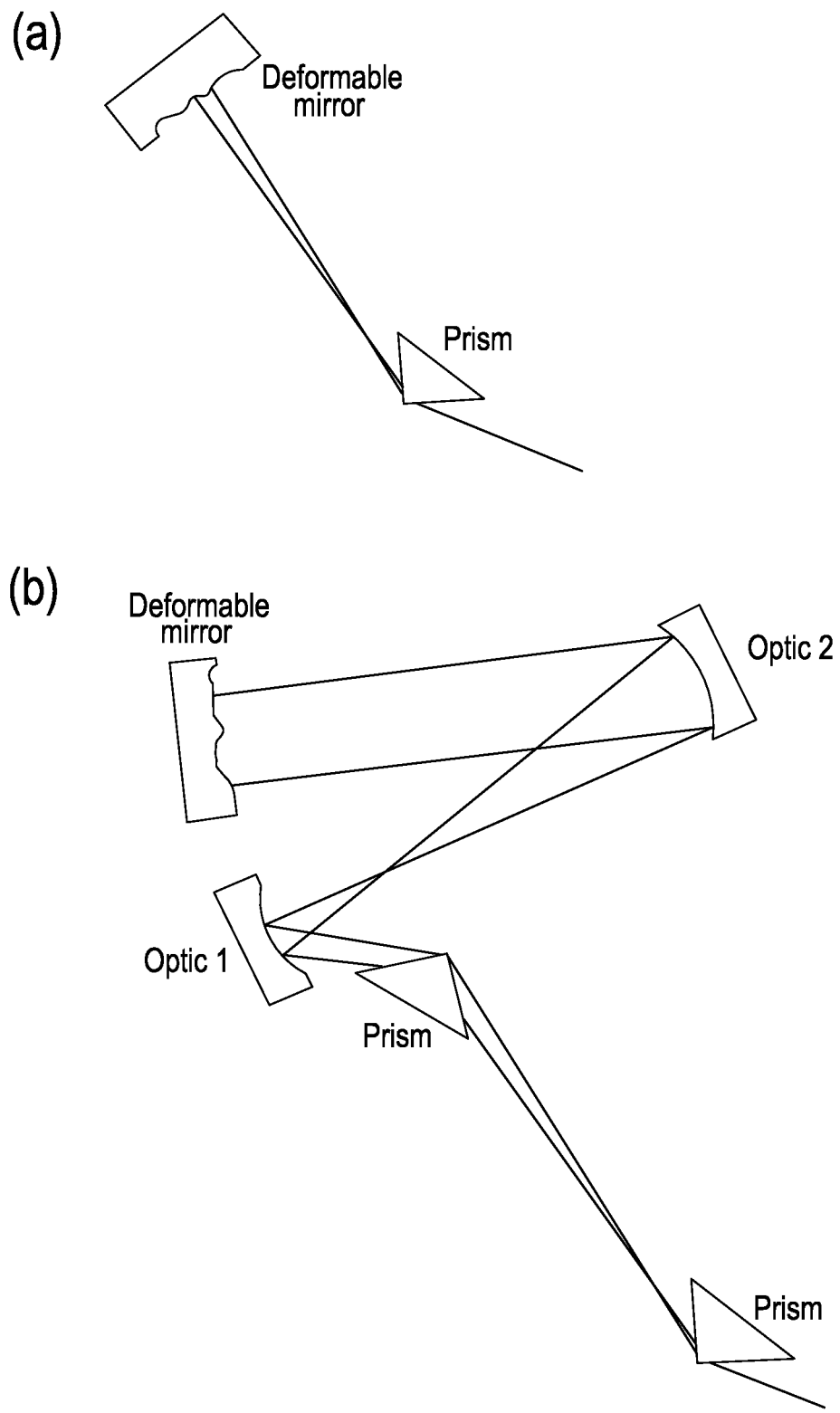
FIG. 6 shows various other laser configurations: (a) a single prism configuration and (b) with expansion optics to enhance the resolution of the setup.

FIG. 6(a) shows part of another laser in accordance with the invention. Here, the setup is similar to that of FIG. 1(a) and (b), but with one prism less. As previously described, the deformable mirror is located at the Fourier plane. However, the relative position of the prism is closer to the deformable mirror and further away from the cavity folding/focusing mirror M2 than for FIG. 1.

FIG. 6(b) shows part of a laser in which reflective expansion optical elements are provided between the second prism of a two-prism compressor and the deformable mirror. The expansion optics expands the beam to fill the aperture of the deformable mirror to increase the resolution of the phase shaping. Similar outcomes can be realized with cavity designs that employ transmissive optical elements (lenses).

Figure 7:
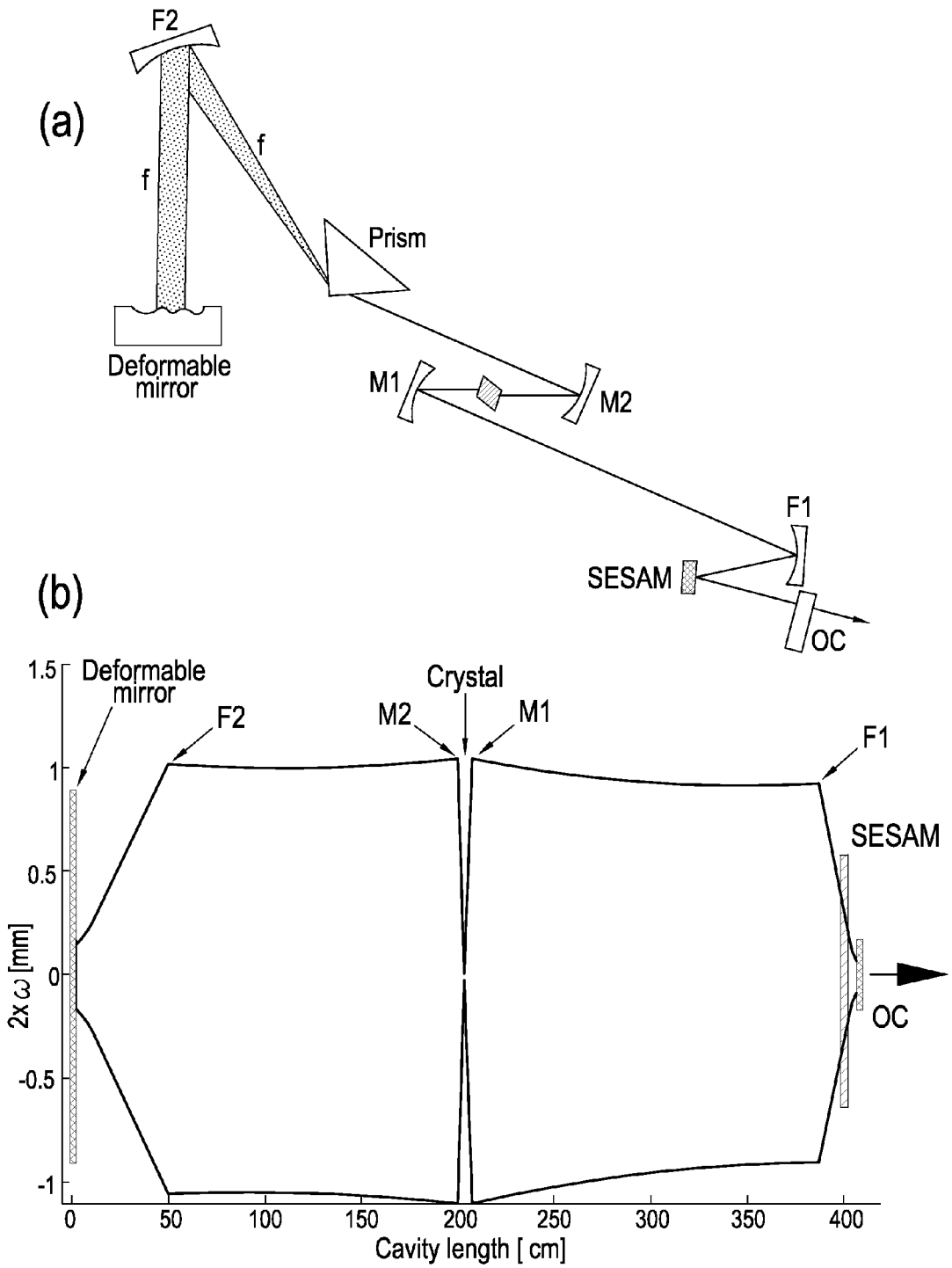
FIG. 7(*a*) shows another laser configuration and FIG. 7(*b*) shows the corresponding calculated mode profile of the cavity.

FIG. 7 (a) shows another laser in which the invention is embodied and FIG. 7(b) shows the simulated mode behavior of the laser cavity of FIG. 7(a), on which the position of the individual components is marked. In this case, a symmetric cavity design is shown, i.e. the distance from the deformable mirror to the laser gain crystal is equal to the distance from the crystal to the output coupler (OC). Here a focusing mirror is provided between the deformable mirror and a prism. The deformable mirror and the prism are located at the focus (f) of the mirror (F2). The focusing mirror images the prism onto the surface of the deformable mirror. The laser gain medium is between two focusing folding mirrors, one of which directs light to the prism, the other directing light to another focusing mirror (F1). Between the second focusing mirror (F1) and the output coupler is a mode-locking SESAM (semiconductor saturable absorber mirror) element. In a Kerr-lens mode-locked laser, this would contain only an output coupler. Optionally, GTI mirrors could also be used to do initial pulse compression and achieve mode locking.

As with other embodiments by inducing changes in the deformable mirror surface profile in the laser of FIG. 7(a), the optical path lengths travelled by the spectral components of the pulse can be altered, resulting in the imposition of different relative phases of its spectral components. Also, intracavity losses can be minimized and the efficiency of the laser thus improved. Deformation of the mirror can also be used to further shorten the pulses, as different orders of frequency chirp can be compensated and these are inaccessible to intracavity prism/s, grating/s or GTI mirror/s alone.

The present invention provides numerous advantages both in terms of the optimization of the basic laser performance and additionally the compensation of external 'propagation' effects. By using a deformable element within the laser cavity, the pulse duration can be optimized by a cavity pre-arrangement. As described previously, this means that the laser can be ultimately self-optimizing and aligning. Pulse phase shaping and pre-chirping of pulses to compensate dispersion effects can also be provided integrally, so that the laser can produce pulses at its output that are designed specifically to meet the needs of particular experimental interactions. For example, for experiments requiring pulses with a particular phase relation, the GOA can be arranged to optimize towards a target phase profile given by the user. Also, for compensation of dispersion that is caused by elements external to the laser, but before an experiment, the GOA can be arranged to optimize towards a target quadratic phase profile. For example, to compensate for chirping, the GOA can cause the output pulse to have the inverse phase shift/profile of the pulse when travelling through the external elements. Hence, by pre-adapting the pulse characteristics from laser, the dispersion caused by external elements can be compensated through suitable laser resonator designs.

A skilled person will appreciate that variations of the disclosed arrangements are possible without departing from the invention. Although the laser is described primarily with reference to a deformable mirror, a liquid-crystal-based component could also be used. Accordingly, the above description of specific embodiments is made by way of example only and not for the purposes of limitation. It will be clear to the skilled person that minor modifications may be made without significant changes to the operation described.

The invention claimed is:

1. An ultrashort-pulse laser that has a resonator that has an internal cavity that includes a laser gain medium, dispersion compensation optics, a mode locking element and a deformable optical element adapted to change its shape and consequently one or more characteristics of pulses output from the internal cavity, and a feedback loop between the pulse laser output and the deformable optical element for controlling the deformable optical element to cause at least one output pulse characteristic to converge towards at least one target, wherein the deformable optical element is positioned at a Fourier plane of the internal cavity, and the one or more output pulse characteristics are one or more of pulse duration; pulse temporal phase; pulse spectral phase; pulse shape and pulse phase shape.

2. The laser as claimed in claim 1 comprising one or more optical elements adapted to spatially resolve the spectrum at the deformable optical element.

3. The laser as claimed in claim 1 wherein the deformable optical element comprises a deformable mirror.

4. The laser as claimed in claim 1 wherein the deformable optical element is based on a liquid crystal device.

5. The laser as claimed in claim 1 comprising means for controlling intracavity group velocity dispersion.

6. The laser as claimed in claim 5 wherein the means for controlling group velocity dispersion comprise an intracavity prism or prism pair.

7. The laser as claimed in claim 1 wherein beam expansion optics are included in the laser cavity.

8. The laser as claimed in claim 1 comprising control means for varying the shape of the deformable mirror.

9. The laser as claimed in claim 8 wherein the control means are operable to optimize one or more of the pulse characteristics.

10. The laser as claimed in claim 8 wherein the control means comprise one or more algorithms stored in a non-transitory computer readable medium associated with said control means.

11. The laser as claimed in claim 10 wherein the one or more algorithms are genetic optimization algorithms.

12. The laser as claimed in claim 1 comprising one or more optical components configured to passively generate ultrashort pulses.

13. The laser as claimed in claim 1, wherein the laser cavity comprises optical properties configured to generate ultrashort pulses.

* * * * *